United States Patent [19]

Paul

[11] Patent Number: 5,146,988
[45] Date of Patent: Sep. 15, 1992

[54] METHOD FOR SCALE REMOVAL IN A WELLBORE

[75] Inventor: James M. Paul, Dallas, Tex.

[73] Assignee: Mobil Oil Corporation, Fairfax, Va.

[21] Appl. No.: 745,780

[22] Filed: Aug. 16, 1991

[51] Int. Cl.$^5$ .............................................. E21B 37/00
[52] U.S. Cl. ........................................ 166/312; 134/3; 166/309.1; 252/8.552
[58] Field of Search ...................... 166/305.1, 307, 311, 166/312, 371; 252/8.552; 134/3

[56] References Cited

U.S. PATENT DOCUMENTS

| | | | |
|---|---|---|---|
| 2,787,326 | 4/1957 | Hughes | 166/302 X |
| 2,964,109 | 12/1960 | Martin | 166/312 X |
| 3,651,868 | 3/1972 | Caudle et al. | 166/307 |
| 4,188,068 | 2/1980 | Holmes et al. | 299/5 |
| 4,778,006 | 10/1988 | Derowitsch | 166/312 X |

Primary Examiner—George A. Suchfield
Attorney, Agent, or Firm—ALexander J. McKillop; Charles J. Speciale; Lawrence O. Miller

[57] ABSTRACT

A method for removing calcium sulfate scale from a well comprising mixing carbon dioxide and water at a downhole location within the well to form an acidic solution containing an equilibrium mixture of carbonic acid, bicarbonate and carbonate ions that will convert the calcium sulfate scale to calcium carbonate scale and subsequent in situ dissolution of the calcium carbonate scale into the acidic solution that flows into the formation about the well.

11 Claims, 1 Drawing Sheet

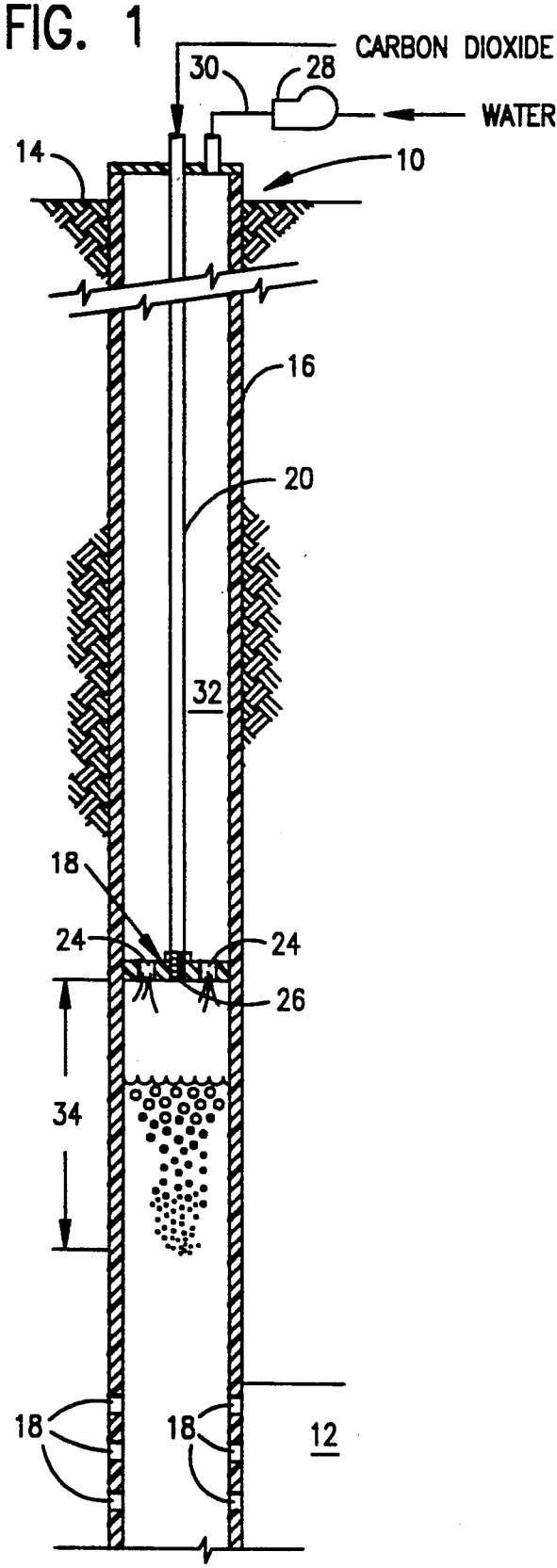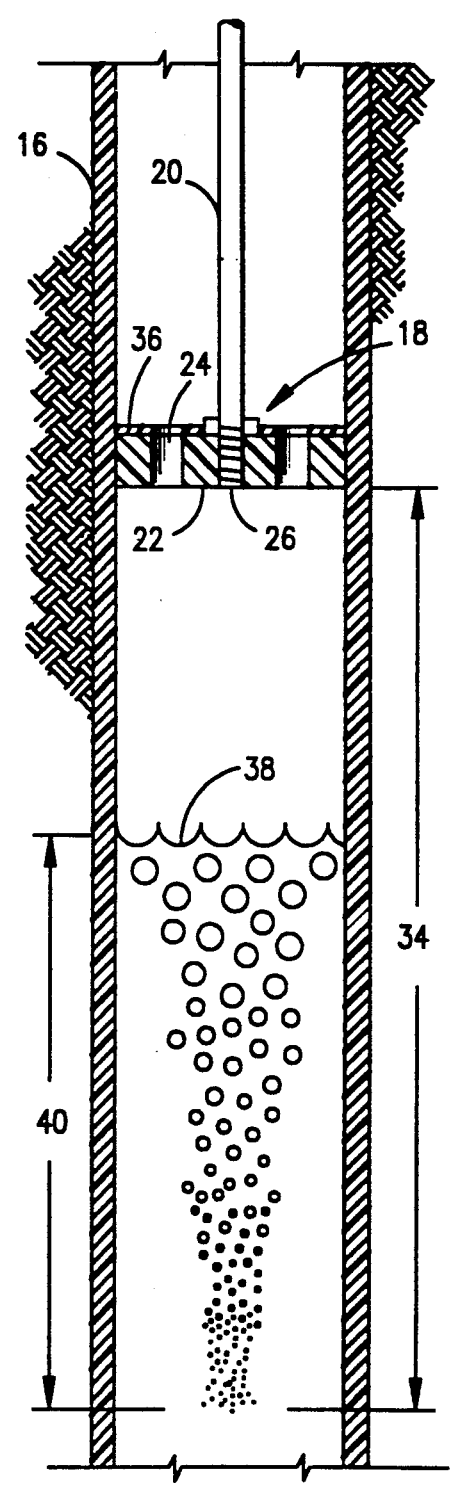

METHOD FOR SCALE REMOVAL IN A WELLBORE

FIELD OF THE INVENTION

This invention relates to a method of removing calcium sulfate scale deposits from wells and particularly a one-step chemical conversion of the calcium sulfate scale to an acid soluble calcium carbonate scale and subsequent in situ dissolution of the calcium carbonate scale.

BACKGROUND OF THE INVENTION

Calcium sulfate scale, commonly called gypsum, is sometimes present in carbonate/dolomite formations that undergo primary, secondary and tertiary oil production. Secondary dissolution of calcium sulfate in the formation, by fresher waters, can carry the calcium sulfate-rich water to the wellbore and near-wellbore formation, where gypsum scale can precipitate. These scales cause severe problems when they occur in downhole equipment, tubing, and perforations in the casing adjacent the formation. Calcium carbonate scales are easily removed by pumping acid solutions, usually 10-15% hydrochloric acid (HCl), downhole to dissolve the scale. However, acid solutions are not effective in removing gypsum scales from the wellbore and/or formation. The commonly used method to remove gypsum is two-part: pumping an inorganic or organic chemical downhole to convert the scale to an acid-soluble compound; and to dissolve the converted scale with dilute acid solutions. Such a converter technique is disclosed in U.S. Pat. Nos. 2,787,326 and 4,155,857. U.S. Pat. No. 3,651,868 also discloses a two stage method of removing calcium sulfate deposits comprising first contacting said deposits with a pressurized solution of ammonium and carbon dioxide in water and then contacting it with an aqueous acid solution. These methods are time consuming and not cost effective for removing scale, and addition the acid is corrosive to metal equipment and hazardous to handle.

The present invention provides an improved method for removing calcium sulfate deposits from wells which combines a one-step chemical conversion of the calcium sulfate scale to calcium carbonate and subsequent in situ dissolution of the calcium carbonate scale without using mineral acids such as hydrochloric acid or nitric acid for dissolution.

SUMMARY OF THE INVENTION

The present invention provides a method for dissolving a calcium sulfate scale in a well which comprises contacting the scale in the well with a solution of carbon dioxide dissolved in water. More specifically, water and carbon dioxide are simultaneously injected into a mixing zone at a downhole location within the well to form an acidic solution containing an equilibrium mixture of carbonic acid, bicarbonate and carbonate ions that converts the calcium sulfate scale within the well and adjacent the formation to calcium carbonate scale and subsequent in situ dissolution of the calcium carbonate scale in the acidic solution. The acidic solution containing the dissolved calcium carbonate scale then flows into the formation about the well. Injection of the water and carbon dioxide is continued until the calcium sulfate scale is removed. In another embodiment, the water may contain an alkali metal salt of carbonate or bicarbonate or an ammonium salt of carbonate or bicarbonate to more effectively convert the calcium sulfate to acid soluble calcium carbonate provided that the pH of the water/carbon dioxide solution is maintained below 7.

DESCRIPTION OF THE DRAWINGS

FIG. 1 schematically illustrates a method for injecting carbon dioxide and water into a mixing zone in a downhole location in a well.

FIG. 2 is an enlarged sectional view of the lower end of the well in FIG. 1.

DESCRIPTION OF THE PREFERRED EMBODIMENTS

In accordance with the present invention, a subterranean formation is penetrated by a wellbore, including a casing in fluid communication therewith by means of well casing perforations in the zone of the formation. Production flow occurs from the formation by the flow of fluids including oil, gas and water through the perforations into the wellbore with the fluids then being recovered. The production of fluids from the well can be inhibited by the formation of calcium sulfate (or gypsum) scale which plugs or partially plugs perforations in the casing of the wellbore, tubing inside the casing, downhole equipment such as pumps and safety valves or the formation adjacent the well.

In the present invention, water is injected into a mixing zone at a downhole location within the well containing the calcium sulfate scale. Carbon dioxide is simultaneously injected into the mixing zone where it dissolves in the water to produce an equilibrium mixture of carbonic acid, bicarbonate and carbonate ions that effectively converts calcium sulfate scale to calcium carbonate scale. Since carbon dioxide dissolved in water will cause the resulting solution to be acidic, the converted calcium carbonate will also be dissolved in-situ. This process depends on an effective method of dissolving carbon dioxide in water, preferably in a mixing zone downhole where existing pressures exceed atmospheric which increases the amount of carbon dioxide dissolved in the water. Such a gas/water downhole mixing process is disclosed in U.S. Pat. No. 4,188,068 which issued on Feb. 12, 1980 to Billy G. Holmes and Jimmie Crofford. This patent is hereby incorporated by reference. This downhole flowing gas mixer is simple to use, extremely cheap, and provides high concentrations of gas-in-water mixtures. In addition, an advantage of this type of gas/water mixer is that the well will not become gas-locked with excess gas. In fact, all carbon dioxide will be dissolved in the water convert and dissolve the scales that then flow into the formation about the well.

Referring to FIG. 1, a production well 10 penetrates an oil-containing formation 12 situated below the earth's surface 14. Well 10 is completed in a known manner with casing 16 and is provided with perforations 18 adjacent the formation 12 to allow fluid communication between the formation 12 and the casing 16.

Once calcium sulfate scale results in a loss of production fluids from well 10, the production well is shut in. Thereafter, referring to FIGS. 1 and 2, mixing apparatus 18 is attached to conduit 20 and is lowered into well 10 to a point slightly above perforations 18. Mixing apparatus 18 consists of a plate 22, openings 24 and a central opening 26 in fluid communication with conduit 20. Water is pumped by pump 28 or the like through line 30 at a predetermined rate into the annulus 32 formed between conduit 20 and casing 16. The water flows into a mixing zone 34 through openings 24 in plate 22 thereby substantially increasing the flow velocity of the water as it passes through these openings.

Meanwhile, carbon dioxide is simultaneously injected into mixing zone 34 through conduit 20 and exits in the form of bubbles through central opening 26 into the water just below plate 22. The carbon dioxide is injected at a rate equal to that required to saturate the water at the conditions of pressure and temperature existing at the mixing zone in the well. Due to the increased flow velocity of the water as it passes through openings 24 surrounding central opening 26, the drag force on the carbon dioxide bubbles is increased as they attempt to rise in the liquid. Further, the pressure drop across plate 22 decreases the effective buoyant force of the carbon dioxide bubbles in the water. Together, these effects prevent the bubbles from passing upward through openings 24 in plate 22. Further, in the case of extremely low water flow rates, it may be necessary to provide a seal between plate 22 and casing 16 by means of a gasket 36 to prevent the bubbles from passing upward around the perimeter of plate 22 so substantially all of the carbon dioxide is trapped to form a carbon dioxide gas pocket 38 in mixing zone 34 below plate 22. The water flows through openings 24 in plate 22 and through gas pocket 38 in the form of high velocity "waterfalls" with gas bubbles becoming entrapped in the water. Part of this gas is dissolved in the liquid as the bubbles are formed and the remaining gas in the liquid is carried down by the "waterfalls" through and out of gas pocket 38. A column of froth 40 is formed by the impact of the liquid falling on the surface below gas pocket 38 and creates an area of extremely high interfacial surface area and liquid turbulence, thereby further promoting mass transfer of carbon dioxide to the water to fully saturate same with little or no excess carbon dioxide being required.

The dissolved carbon dioxide in water, containing an equilibrium mixture of carbonic acid, bicarbonate and carbonate ions, effectively converts the calcium sulfate scale to calcium carbonate scale. Since carbon dioxide dissolved in the water causes the resulting solution to be acidic, the converted calcium carbonate scale will also be dissolved in-situ. The acidity of the water/$CO_2$ solution is a function of the amount of carbon dioxide dissolved in the water at the existing downhole pressure and temperature. The acidic solution containing dissolved calcium carbonate scale flows into the formation about the casing 16 through perforations 18.

In another embodiment of our invention, an alkali metal salt of carbonate or bicarbonate or an ammonium salt of carbonate or bicarbonate salt such as sodium carbonate or bicarbonate, potassium carbonate or bicarbonate and ammonium carbonate or bicarbonate may be added to the water to provide additional bicarbonate and carbonate ions to more effectively convert the calcium sulfate scale to calcium carbonate scale. The amount of alkali metal salt of carbonate or bicarbonate or an ammonium salt of carbonate or bicarbonate added to the water will vary depending upon the amount of existing bicarbonate/carbonate ions in the water, however, it is important to maintain the pH of the water/carbon dioxide solution below 7.

What is claimed:

1. A method of dissolving a calcium sulfate wellbore scale which comprises contacting the scale in the wellbore with a solution consisting essentially of carbon dioxide dissolved in water.

2. A method according to claim 1 wherein the solution of carbon dioxide dissolved in water contains an alkali metal salt of carbonate or bicarbonate or an ammonium salt of carbonate or bicarbonate in an amount sufficient to maintain the pH of the solution of carbon dioxide dissolved in water below 7.

3. A method for converting calcium sulfate contained in wellbore scale to an acid-soluble calcium carbonate scale and subsequent in-situ dissolution of the calcium carbonate scale comprising contacting the calcium sulfate scale with a solution consisting essentially of carbon dioxide dissolved in water containing an equilibrium mixture of carbonic acid, bicarbonate and carbonate ions.

4. A method according to claim 3 wherein the solution of carbon dioxide dissolved in water contains an alkali metal salt of carbonate or bicarbonate or an ammonium salt of carbonate or bicarbonate in an amount sufficient to maintain the pH of the solution of carbon dioxide dissolved in water below 7.

5. A method according to claim 3 wherein the calcium sulfate scale is contacted by the solution of carbon dioxide dissolved in water at a downhole location within the wellbore.

6. A method according to claim 5 wherein the solution of carbon dioxide dissolved in water is formed by mixing water and carbon dioxide in a mixing zone at a downhole location within the wellbore causing the water to be completely saturated with carbon dioxide at the conditions of pressure and temperature at the downhole location.

7. A method for removing calcium sulfate scale within a well penetrating a subterranean formation, said well in fluid communication with said formation, said method comprising simultaneously injecting water and carbon dioxide into a mixing zone at a downhole location within said well to form an acidic solution containing an equilibrium mixture of carbonic acid, bicarbonate and carbonate ions that converts the calcium sulfate scale in the well and adjacent the formation to calcium carbonate scale and subsequent in-situ dissolution of the calcium carbonate scale in the acidic solution, said acidic solution containing dissolved calcium carbonate scale flowing into the formation about the well.

8. A method according to claim 7 wherein an alkali metal salt of carbonate or bicarbonate or an ammonium salt of carbonate or bicarbonate is added to the injected water in an amount sufficient to maintain the pH of the water/carbon dioxide solution below 7.

9. A method according to claim 7 wherein the carbon dioxide and water are mixed at the downhole location within the well by positioning a mixing means having a central restrictive opening therethrough and additional restriction openings therethrough surrounding said central opening at said downhole location within said well; flowing said water down said well through said restrictive openings surrounding said central opening in said mixing means, and simultaneously supplying carbon dioxide downhole to said restrictive central opening in said mixing means, where said increased flow velocity of said water as it passes through said restrictive openings surrounding said central opening increases the drag force on said gaseous carbon dioxide and decreases the buoyant effect of the water to thereby trap said carbon dioxide below said mixing zone where said carbon dioxide becomes mixed with said water as said water flows through said trapped carbon dioxide.

10. A method according to claim 9 including controlling the supply of said carbon dioxide to said mixing zone to maintain the volume of said trapped carbon dioxide substantially constant.

11. A method according to claim 7 wherein the carbon dioxide is injected into the mixing zone at a rate equal to that required to saturate the water at the conditions of pressure and temperature existing at the mixing zone in the well.

* * * * *